United States Patent [19]

Arai

[11] Patent Number: 5,079,402
[45] Date of Patent: Jan. 7, 1992

[54] LASER BEAM BENDER

[75] Inventor: Takeji Arai, Yamanashi, Japan

[73] Assignee: Fanuc Ltd., Minamitsuru, Japan

[21] Appl. No.: 474,085

[22] PCT Filed: Aug. 22, 1989

[86] PCT No.: PCT/JP89/00858
§ 371 Date: Apr. 18, 1990
§ 102(e) Date: Apr. 18, 1990

[87] PCT Pub. No.: WO90/02627
PCT Pub. Date: Mar. 22, 1990

[30] Foreign Application Priority Data

Sep. 7, 1988 [JP] Japan .................. 63-224084

[51] Int. Cl.⁵ ................................ B23K 26/06
[52] U.S. Cl. .................. 219/121.74; 359/796; 359/872
[58] Field of Search .......... 219/121.74, 121.78, 219/121.79, 121.63, 121.64; 350/632, 636, 482

[56] References Cited
U.S. PATENT DOCUMENTS 3,334,959  8/1967  Walsh ........................ 350/310
3,601,476  8/1971  Mackenzie .................. 350/486
4,626,649  12/1986  Dupeyrat et al. ......... 219/121.78
4,910,378  3/1990  Arai ............................ 219/121.74

FOREIGN PATENT DOCUMENTS

WO89/02337  7/1989  World Int. Prop. O. .

Primary Examiner—C. L. Albritton
Attorney, Agent, or Firm—Staas & Halsey

[57] ABSTRACT

A laser beam bender for changing the direction of a laser beam which includes a mirror holder having a spherical sliding surface having the reflection center of a reflection mirror as the center of curvature thereof is fixed on an L-shaped light guide member for guiding the laser beam. A mirror holding member holds the reflection mirror and has a sliding surface which slides on the sliding surface of the mirror holder. A micrometer moves the mirror holder in a lateral direction and causes the mirror holding member to slide. The reflection center of the reflection mirror remains stationary when the mirror holding member is slidably moved by the micrometer to adjust the reflection angle of the reflection mirror.

5 Claims, 2 Drawing Sheets

5,079,402

LASER BEAM BENDER

BACKGROUND OF THE INVENTION

1. Field of the Invention

This invention relates to a laser beam bender used in a laser beam machine composed of a combination of an articulated robot and a laser oscillator, and now particularly, to a laser beam bender capable of adjusting a reflection angle while the center of a reflection mirror is fixed.

2. Description of the Art

A laser beam machine composed of a combination of an articulated robot and a laser oscillator is widely used for metal welding or to effect a heat treatment process. With such a combination the positioning precision by the robot is thereby enhanced and the laser beam machine can be constructed by coupling a laser oscillator to a commercially available robot.

With this type of laser beam machine, it is necessary to guide a laser beam along the arm of the robot from the laser oscillator to the wrist of the robot, and accordingly, a laser beam bender for changing the direction of the laser beam must be provided midway of the path thereof.

In such a laser beam bender, a mirror holder or the like on which a reflection mirror is fixed is adjusted by using a micrometer or screw. In the laser beam benders now used, however, when the reflection angle of the mirror holder is adjusted by the micrometer, not only the reflection angle but also the mirror holder is moved linearly, and thus the center of the reflection mirror is also moved. As a result, the center of the reflection mirror must be returned to the original position thereof after the reflection angle is adjusted, but the reflection angle is changed when the center of the reflection mirror is returned to its original position, and therefore, the reflection angle must be again adjusted, and this adjustment must be repeatedly effected to finally obtain an accurate reflection angle.

SUMMARY OF THE INVENTION

It is an object of the present invention to provide a laser beam bender capable of adjusting the reflection angle while the center of the reflection mirror is fixed.

The present invention achieves the above object by providing a laser beam bender for changing the direction of a laser beam, the bender including "L-shaped" light guide member for guiding the laser beam; a mirror holder fixed to the light guide member and having as an internal surface a spherical sliding surface having the reflection center of a reflection mirror as the center thereof; a mirror holding member for holding the reflection mirror and having a sliding surface able to slide on the sliding surface of the mirror holder; a micrometer or screw for moving the mirror holder member in a lateral direction; a first spring for applying a drag to the micrometer in the lateral direction; and a second spring for applying a drag to the micrometer in a vertical direction.

Since the mirror holding member holding the reflection mirror and the mirror holder fixed on the light guide member are able to slide on spherical surfaces thereof having the reflection center of the reflection mirror as the centers thereof, the center of the reflection mirror is not changed even if the mirror holding member is slidably moved by the micrometer, thus making it possible to easily adjust only the reflection angle.

DESCRIPTION OF THE PREFERRED EMBODIMENT

Figure 1:
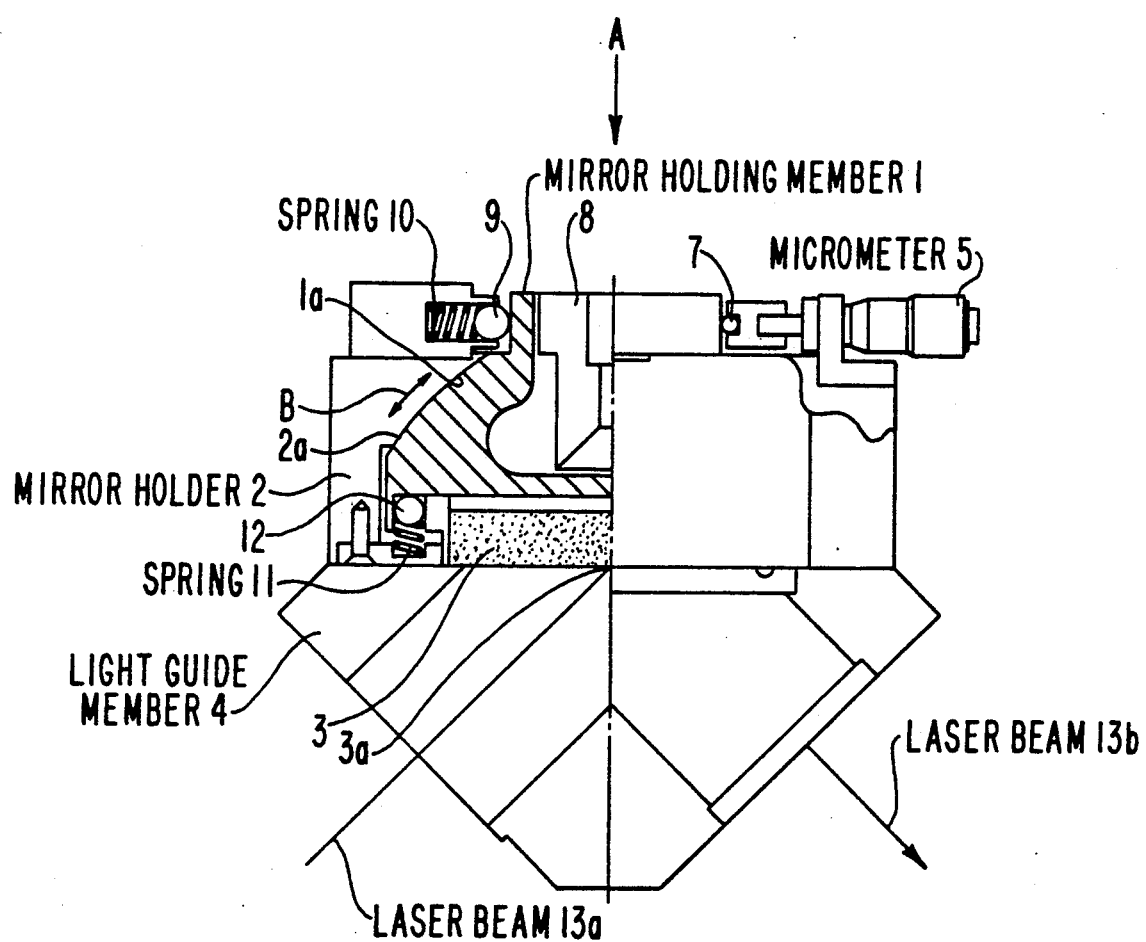
FIG. 1 is a view showing one embodiment of a laser beam bender according to this invention.

Referring to the drawings, shown in FIG. 1 is one embodiment of a laser beam bender according to this invention. In FIG. 1, 1 denotes a mirror holding member formed of, for example, brass. The mirror holding member 1 holds a reflection mirror 3. Further, 3a denotes the reflection center of the reflection mirror to which the center of the optical axis of a laser beam 13a is applied, and 2 denotes a mirror holder fixed on a light guide member 4. The light guide member 4 has an "L-shaped" configuration, and the laser beam 13a passes through one side of the light guide member 4, is reflected at the reflection mirror 3, and the laser beam 13b is then emitted from the other side of the light guide member 4.

Numeral 5 denotes a micrometer which is rotated to cause a member 8 to be moved via a sphere 7 mounted on the tip end of the micrometer, to thereby move the mirror holding member 1 in a lateral direction. The mirror holding member 1 is pressed in the lateral direction against a sphere 9 mounted on a spring 10 and pressed in the vertical direction against a sphere 12 mounted on a spring 11.

The sliding surface 1a of the mirror holding member 1 is a spherical surface having the reflection center 3a of the reflection mirror 3 as the center thereof, and a sliding surface 2a of the mirror holder 2 has the same configuration. Therefore, although an adjustment of the micrometer 5 causes the mirror holding member 1 to slide as indicated by an arrow B in FIG. 1, the reflection center 3a of the reflection mirror 3 does not move, and therefore, an easy adjustment of only the reflection angle is possible. The preferred actual angle adjustment is in the range of ±2.5 degrees. No problem will arise, however if the angle adjustment is in the range of ±5 degrees.

In the above explanation, the angle is adjusted in a plane parallel to the plane of FIG. 1, but the angle can be adjusted in the same manner in a plane perpendicular to the plane of FIG. 1.

Figure 2:
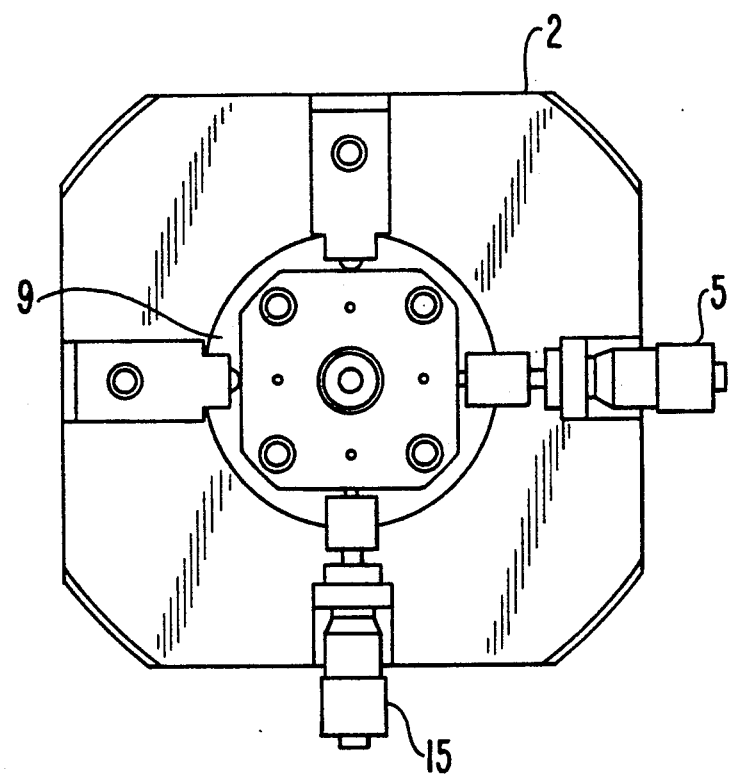
FIG. 2 is a view of the laser beam bender along an arrow A in FIG. 1.

FIG. 2 is a view of the laser beam bender along the arrow A of FIG. 1. The angle adjustment in the plane parallel to the plane of FIG. 1 is effected by the micrometer 5, and the angle adjustment in a plane perpendicular to the plane of the Figure is effected by another micrometer 15. This permits the angle adjustment of the reflection mirror 3 to be effected in a desired direction without moving the reflection center 3a, thus making it easier to effect the angle adjustment.

In the above explanation, the construction is such that the angle can be adjusted by using two micrometers, but it is possible to use a construction having three or more micrometers. Further, it is possible to use a screw instead of the micrometer.

As described above, in this invention, since the mirror holding member and the mirror holder are able to slide on spherical surfaces having the reflection center of the reflection mirror as the respective centers, it is possible to adjust only the reflection angle without moving the center of the reflection mirror, thereby making it easier to adjust the angle.

I claim:

1. A laser beam bender for changing the direction of a laser beam comprising:

an L-shaped light guide member for guiding the laser beam;

a reflection mirror;

a mirror holder fixed to the light guide member, said mirror holder having as an internal surface a spherical sliding surface having the reflection center of said reflection mirror as its center of curvature thereof;

a mirror holding member for holding said reflection mirror and having a sliding surface adapted to slide on the sliding surface of said mirror holder;

means for moving said mirror holder member in a lateral direction;

a first spring for applying drag in the lateral direction to said means for moving said mirror holder member; and a sound spring for applying drag in a vertical direction to said means for moving said mirror holder member.

2. A laser beam bender according to claim 1, wherein said means for moving said mirror holder member includes at least two micrometers arranged at right angles to each other.

3. A laser beam bender according to claim 1, which includes a sliding sphere mounted on the tip end of each of said first and second springs.

4. A laser beam bender according to claim 1, wherein said sliding surface of said mirror holding member is spherical and has the reflection center of said reflection mirror as its center of curvature thereof.

5. A laser beam bender according to claim 1, wherein said means for moving said mirror holder member comprises a micrometer.

* * * * *

UNITED STATES PATENT AND TRADEMARK OFFICE
CERTIFICATE OF CORRECTION

PATENT NO. : 5,079,402
DATED     : January 7, 1992
INVENTOR(S) : TAKEJI ARAI

It is certified that error appears in the above-identified patent and that said Letters Patent is hereby corrected as shown below:

Column 1, line 8, "now" should be --more--;

line 18, "delete "thereby";

line 49, after "including" insert --an--.

Column 2, line 7, delete "an";

line 13, "this" should be --the present--;

line 14, after "FIG. 1," insert --the numeral--.

Signed and Sealed this

Eighteenth Day of May, 1993

Attest:

MICHAEL K. KIRK

Attesting Officer

Acting Commissioner of Patents and Trademarks